(12) United States Patent
Hida (10) Patent No.: US 10,967,513 B2
(45) Date of Patent: Apr. 6, 2021

(54) TORCH CABLE INTERFERENCE EVALUATION INFORMATION OUTPUT DEVICE FOR WELDING ROBOT, EVALUATION INFORMATION OUTPUT METHOD, AND PROGRAM

(71) Applicant: Kobe Steel, Ltd., Hyogo (JP)

(72) Inventor: Masatoshi Hida, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 432 days.

(21) Appl. No.: 16/003,371

(22) Filed: Jun. 8, 2018

(65) Prior Publication Data

US 2019/0001495 A1   Jan. 3, 2019

(30) Foreign Application Priority Data

Jun. 30, 2017 (JP) .............................. JP2017-128826

(51) Int. Cl.
| | |
|---|---|
| *B23K 9/00* | (2006.01) |
| *B25J 9/16* | (2006.01) |
| *G05B 19/402* | (2006.01) |
| *B25J 15/00* | (2006.01) |

(52) U.S. Cl.
CPC .............. *B25J 9/1671* (2013.01); *B23K 9/00* (2013.01); *B25J 9/1605* (2013.01); *B25J 9/1676* (2013.01); *B25J 15/0019* (2013.01); *G05B 19/402* (2013.01); *G05B 2219/45104* (2013.01)

(58) Field of Classification Search
CPC ...... B23K 9/126; B23K 9/127; B23K 9/1336; B23K 9/287; G05B 2219/45083
See application file for complete search history.

(56) References Cited

U.S. PATENT DOCUMENTS

| | | | | |
|---|---|---|---|---|
| 2011/0015785 A1* | 1/2011 | Tsusaka | ................. | B25J 9/0003 700/254 |
| 2016/0101526 A1* | 4/2016 | Saito | .................... | H02K 11/215 74/490.06 |
| 2016/0132623 A1 | 5/2016 | Takeda | | |

FOREIGN PATENT DOCUMENTS

JP          2016-087750 A       5/2016

* cited by examiner

*Primary Examiner* — Erin B Saad (74) *Attorney, Agent, or Firm* — Studebaker & Brackett PC (57) ABSTRACT

In an interference evaluation device, an axis value obtaining unit obtains posture information indicating a posture to be taken by a welding robot, on the basis of teaching information for teaching an operation to the welding robot. A reference point calculation unit, an extension direction calculation unit, and an evaluation value setting unit generate evaluation information indicating a degree of bend of a torch cable, which is caused by the torch cable contacting an arm of the welding robot, by using the posture information obtained by the axis value obtaining unit. The torch cable is included in a welding tool attached to an end of the arm and extending in a direction away from a welding torch of the welding tool. An evaluation value output unit outputs the evaluation information generated by the reference point calculation unit, the extension direction calculation unit, and the evaluation value setting unit.

8 Claims, 6 Drawing Sheets

TORCH CABLE INTERFERENCE EVALUATION INFORMATION OUTPUT DEVICE FOR WELDING ROBOT, EVALUATION INFORMATION OUTPUT METHOD, AND PROGRAM

BACKGROUND OF THE INVENTION

1. Field of the Invention

The present invention relates to a torch cable interference evaluation information output device for a welding robot, an evaluation information output method, and a program for outputting evaluation information about a torch cable of a welding robot.

2. Description of the Related Art

A robot system including a welding robot is known in which a welding tool attached to an end of an arm of the welding robot is moved along a predetermined work line to perform a welding task. A torch cable through which a welding wire passes is connected to the welding tool, and it is necessary to undertake an evaluation for the torch cable to create or examine a teaching program or the like for teaching an operation to the welding robot.

Japanese Unexamined Patent Application Publication No. 2016-87750 describes a robot simulation device. The robot simulation device generates a three-dimensional line-member model by using a plurality of mass points and a plurality of spring elements connecting the plurality of mass points to each other, sets a plurality of focus points on the line-member model to understand the torsional state of a line member, simulates the operation of the line member in accordance with the operation of a robot by using the line-member model, and displays a line-member image and focus-point images by using time-series position data obtained as a result of the simulation, namely, time-series position data of the plurality of mass points and time-series position data of the plurality of focus points.

Typically, if an evaluation for the torch cable, namely, an evaluation of the state of interference between the torch cable and the arm, is not performed, a contact between the torch cable and the arm during an actual operation of the welding robot can significantly increase welding-wire-feed resistance or can damage the torch cable.

In this case, it is conceivable to adopt a configuration for outputting evaluation information indicating whether interference occurs between the torch cable and the arm. However, this configuration makes it difficult to accurately determine the state of interference between the torch cable and the arm. Due to the flexibility, the torch cable is permitted to interfere with the arm to some extent. Thus, simple determination of whether interference occurs makes it difficult to determine whether the operation of the welding robot is possible.

SUMMARY OF THE INVENTION

Accordingly, it is an object of the present invention to provide accurate determination of the state of interference between a torch cable and an arm of a welding robot.

To this end, an aspect of the present invention provides an evaluation information output device. The evaluation information output device includes obtaining means for obtaining posture information indicating a posture to be taken by a welding robot, on the basis of teaching information for teaching art operation to the welding robot, generation means for generating evaluation information indicating a degree of bend of a torch cable, which is caused by the torch cable contacting an arm of the welding robot, by using the posture information. Obtained by the obtaining means, the torch cable being included in a welding tool attached to an end of the arm and extending in a direction away from a welding torch of the welding tool, and output means for outputting the evaluation information generated by the generation means.

The generation means may include first calculation means for calculating change information indicating a position of the torch cable and an extension direction of the torch cable when the welding robot changes the posture, by using reference information indicating a position of the torch cable and an extension direction of the torch cable when the welding robot takes a reference posture and by using the posture information obtained by the obtaining means, and second calculation means for calculating the evaluation information by using the change information calculated by the first calculation means and area information indicating an area occupied by the arm.

The generation means may generate, as the evaluation information, a radius of an arc by which the bend of the torch cable is approximated. In this case, the arc may be an arc passing through a boundary point between a torch cable holder of the welding tool and the torch cable and passing through a contact point between the torch cable and the arm when the contact between the torch cable and the arm is a point contact. When the contact between the torch cable and the arm is a line contact, the arc may be an arc passing through a boundary point between a torch cable holder of the welding tool and the torch cable and passing through a contact point that is closest to the boundary point among contact points between the torch cable and the arm.

Further, the generation means may generate the evaluation information by using different methods when the contact between the torch cable and the arm is a point contact and when the contact between the torch cable and the arm is a line contact.

Further, when the evaluation information is within an allowable range, the output means may further output information indicating that the evaluation information is within the allowable range.

Another aspect of the present invention provides an evaluation information output method. The evaluation information output method includes the steps of obtaining posture information indicating a posture to be taken by a welding robot, on the basis of teaching information for teaching an operation to the welding robot; generating evaluation information indicating a degree of bend of a torch cable, which is caused by the torch cable contacting an arm of the welding robot, by using the obtained posture information, the torch cable being included in a welding tool attached to an end of the arm and extending in a direction away from a welding torch of the welding tool; and outputting the generated evaluation information.

Still another aspect of the present invention provides a program for causing a computer to implement a function of obtaining posture information indicating a posture to be taken by a welding robot, on the basis of teaching information for teaching an operation to the welding robot; a function of generating evaluation information indicating a degree of bend of a torch cable, which is caused by the torch cable contacting an arm of the welding robot, by using the obtained posture information, the torch cable being included in a welding tool attached to an end of the arm and extending in a direction away from a welding torch of the welding tool; and a function of outputting the generated evaluation information.

According to aspects of the present invention, the state of interference between a torch cable and an arm of a welding robot can be accurately determined.

DESCRIPTION OF THE PREFERRED EMBODIMENTS

The following describes an embodiment of the present invention in detail with reference to the accompanying drawings.

Configuration of Robot System

Figure 1:
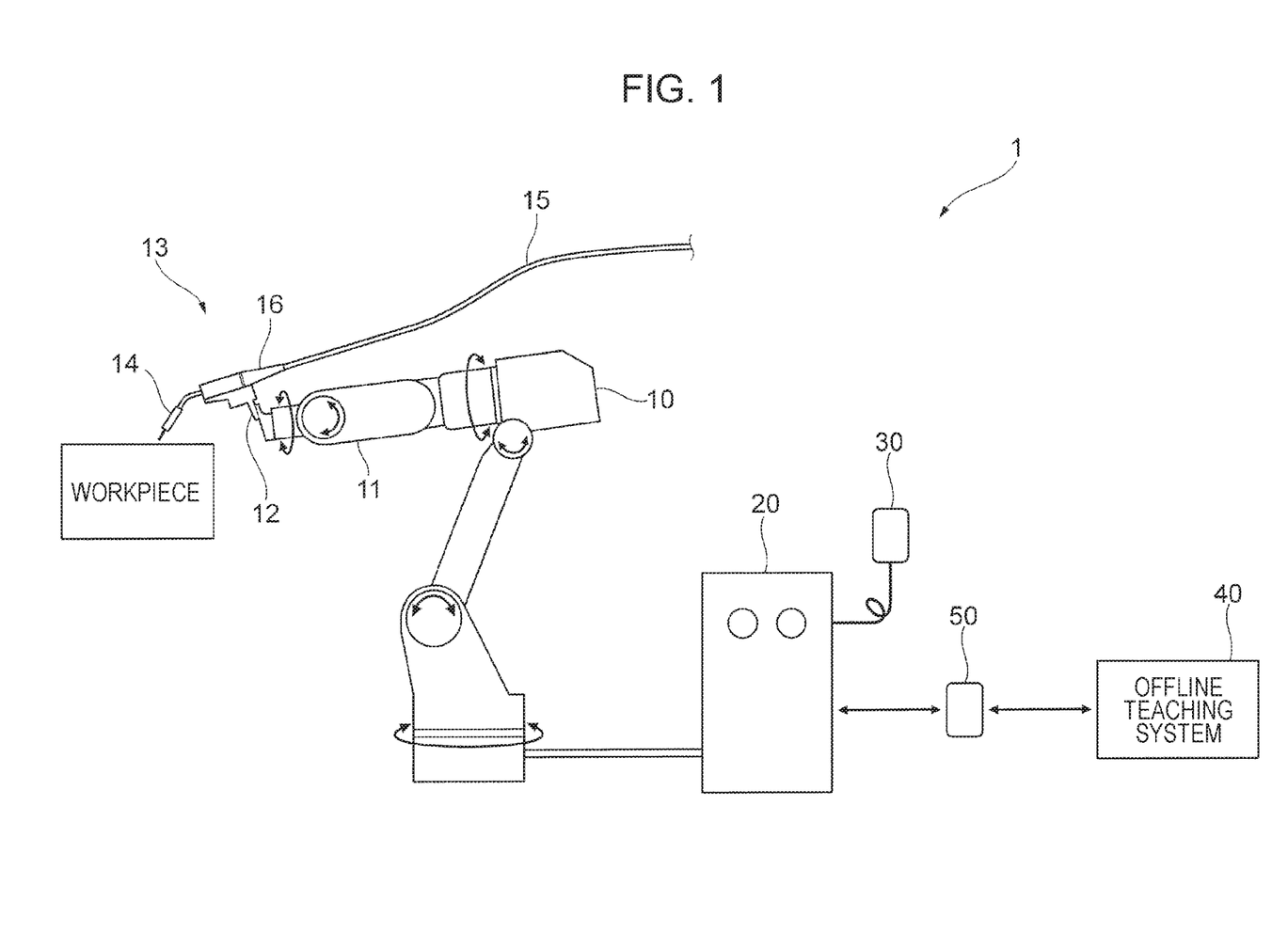
FIG. 1 is a diagram illustrating an example schematic configuration of a robot system according to an embodiment of the present invention.

FIG. 1 is a diagram illustrating an example schematic configuration of a robot system 1 according to this embodiment.

As illustrated in FIG. 1, the robot system 1 includes a welding robot (manipulator) 10, a control panel 20, a teaching pendant 30, and an offline teaching system 40. The offline teaching system 40 is configured to write a teaching program describing an operation to be executed by the welding robot 10 to a removable recording medium 50 such as a flexible disk or a memory card, and the control panel 20 is configured to read the teaching program written in the recording medium 50. Alternatively, the offline teaching system 40 may transfer the teaching program to the control panel 20 via data communication.

The welding robot 10 includes an arm 11 having a plurality of joints and performs various tasks under control of the control panel 20. The welding robot 10 also includes a welding tool 13 at an end of the arm 11 through a wrist portion 12 to weld a workpiece. The welding tool 13 includes a welding torch 14 for feeding a welding wire to a workpiece, a torch cable 15 through which the welding wire passes, and a torch cable holder 16 for holding the torch cable 15.

The control panel 20 is disposed away from the welding robot 10 and controls the operation of the welding robot 10 and a peripheral shaft (a slider or a positioner) (not illustrated). In this case, the control panel 20 activates the teaching program to control, for example, the position and posture of the welding torch 14.

The teaching pendant 30 instructs the control panel 20 to execute the teaching program. In some cases, the teaching pendant 30 modifies values in the teaching program executed by the control panel 20.

The offline teaching system 40 creates in advance the teaching program to be executed by the control panel 20 and delivers the teaching program to the control panel 20 via the recording medium 50 or via data communication, as described above.

Hardware Configuration of Offline Teaching System

Figure 2:
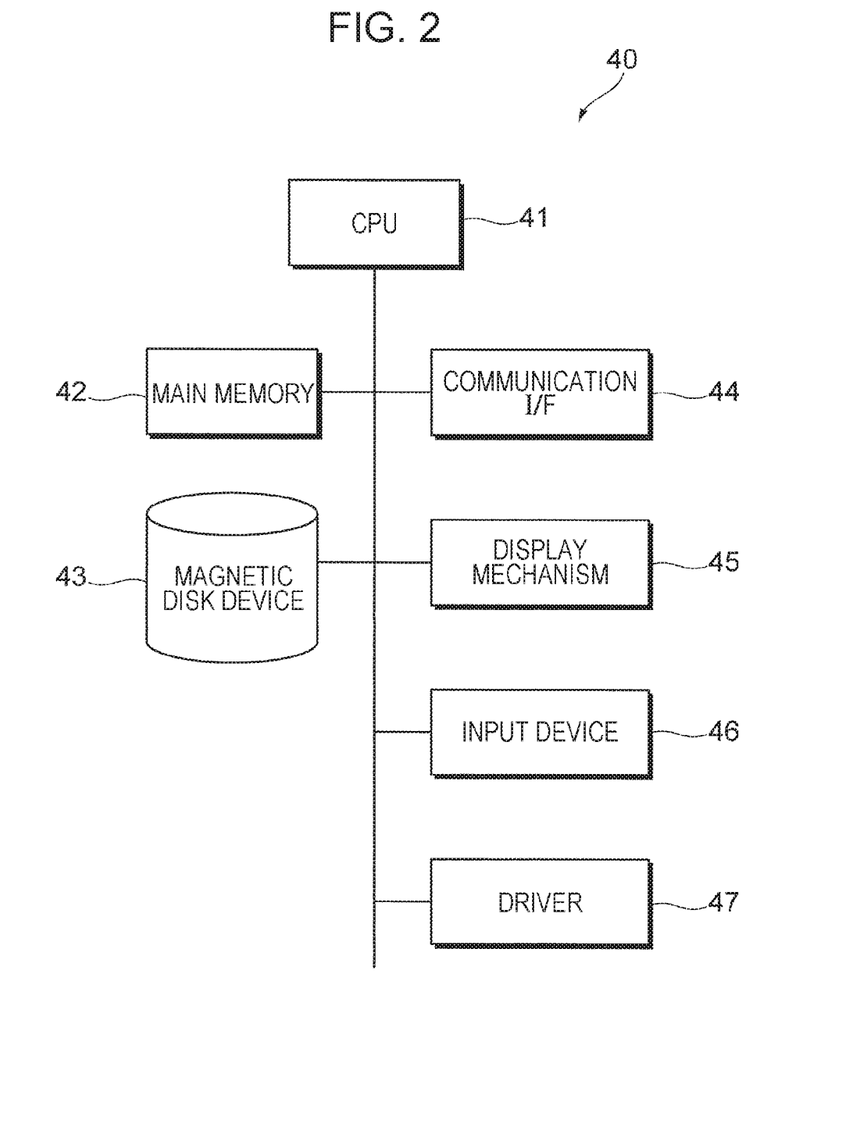
FIG. 2 is a diagram illustrating an example hardware configuration of an offline teaching system according to the embodiment of the present invention.

FIG. 2 is a diagram illustrating an example hardware configuration of the offline teaching system 40.

As illustrated in FIG. 2, the offline teaching system 40 is implemented by, for example, a general-purpose personal computer (PC). The offline teaching system 40 includes a central processing unit (CPU) 41, a main memory 42, and a magnetic disk device (hard disk drive (HDD)) 43. The CPU 41 serves as computing means, and the main memory 42 and the magnetic disk device (HDD) 43 serve as storage means. The CPU 41 executes various programs such as an operating system (OS) and application software and implements the functions of the offline teaching system 40. The main memory 42 is a storage area that stores various programs or data and so on to be used to execute the programs. The HDD 43 is a storage area that stores input data for the various programs, output data from the various programs, and so on.

The offline teaching system 40 further includes a communication interface (I/F) 44 for communicating with an external device, a display mechanism 45 including a video memory and a display, an input device 46 including a keyboard and a mouse, and a driver 47 for reading or writing data from or to a storage medium. FIG. 2 illustrates an example hardware configuration of the offline teaching system 40 when the offline teaching system 40 is implemented by a computer system, and the configuration of the offline teaching system 40 is not limited to that illustrated in FIG. 2.

Coordinates, etc. Used in Embodiment

Figure 3:
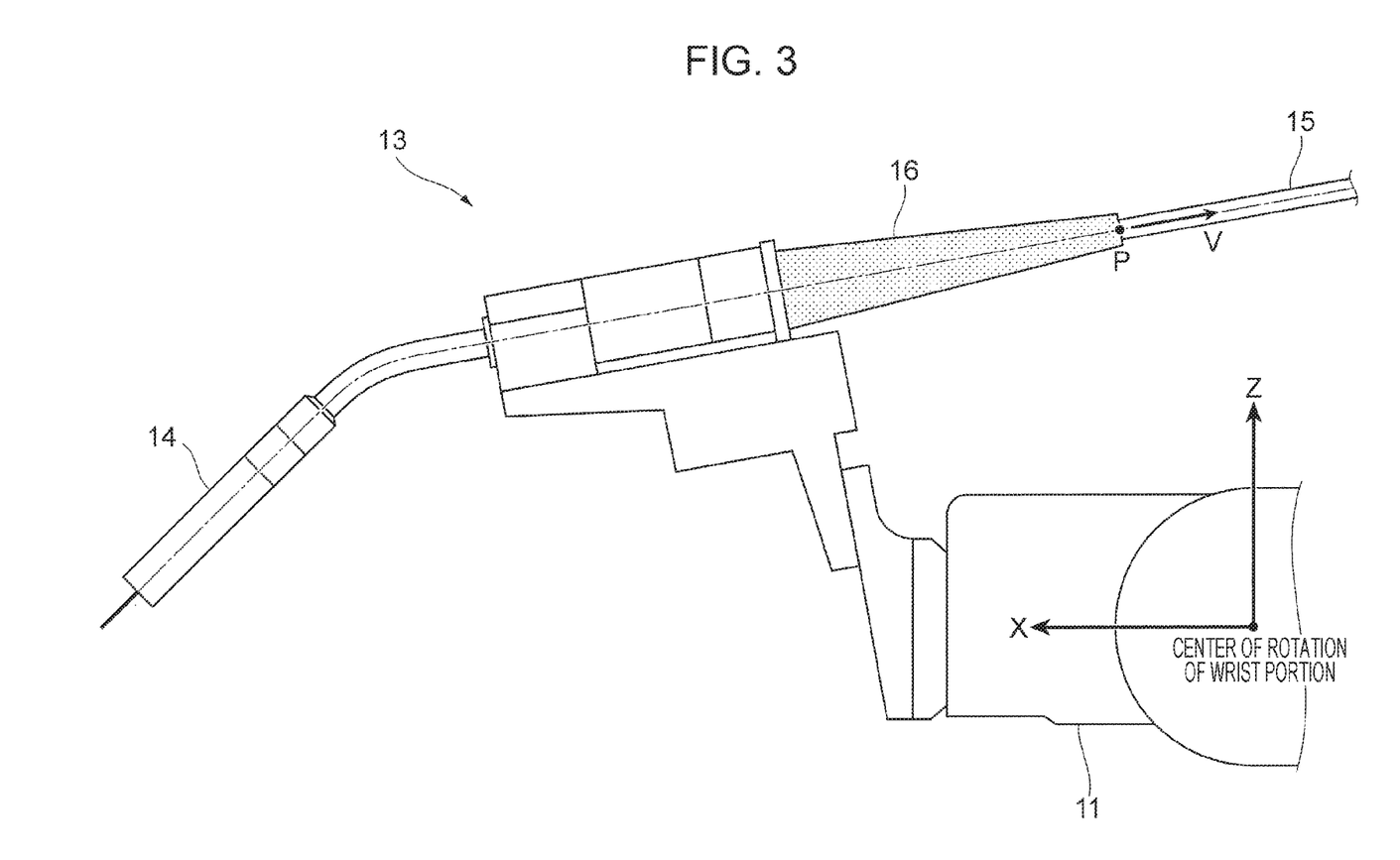
FIG. 3 is a diagram illustrating a schematic shape of a welding tool, a reference point, and a cable extension direction according to the embodiment of the present invention.

FIG. 3 is a diagram illustrating a schematic shape of the welding tool 13, a reference point, and a cable extension direction. Since the reference point and the cable extension direction define the relationship with the arm 11, it is sufficient to use directions and a position based on a coordinate system on the arm 11 illustrated in FIG. 3. In this embodiment, the operation of first to fourth axes of the welding robot 10 does not affect the positional relationship between the arm 11 and the welding tool 13, and a coordinate system having an origin at the center of rotation of the wrist portion 12, which is the point of intersection of fifth and sixth axes, is considered. In this coordinate system, the leftward direction in FIG. 3 denotes a positive direction of an X axis, the direction toward the viewer in FIG. 3 denotes a positive direction of a Y axis, and the upward direction in FIG. 3 denotes a positive direction of a Z axis. In this coordinate system, the reference point is represented by P, and the cable extension direction is represented by V. In this embodiment, as a non-limiting example, the reference point P is set in a boundary portion between the torch cable 15 and the torch cable holder 16. The reference point P may be set at any location on the welding tool 13. In addition, two or more reference points P may be set.

Although not illustrated in FIG. 3, when all of the axis values of the welding robot 10 are 0, the coordinates of the reference point in this coordinate system are represented by (Xref, Pref, Zref) and the vector components in the direction in which the torch cable 15 extends (hereinafter referred to as the "cable extension direction") are represented by (Uref, Vref, Wref). Furthermore, the width of the arm 11 is represented by W and the height of the arm 11 is represented by H.

Functional Configuration of Interference Evaluation Device

Figure 4:
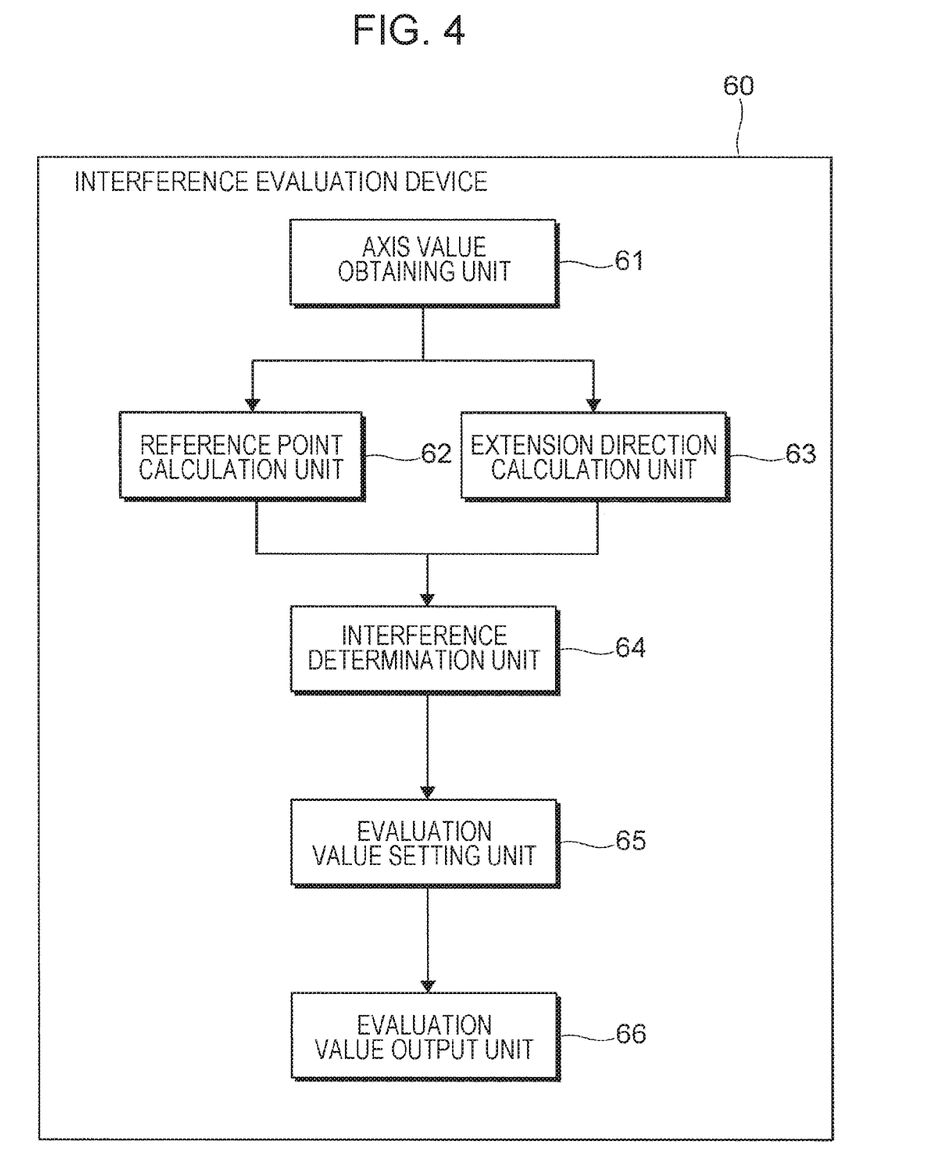
FIG. 4 is a diagram illustrating an example functional configuration of an interference evaluation device according to the embodiment of the present invention.

FIG. 4 is a diagram illustrating an example functional configuration of an interference evaluation device 60 according to this embodiment. The interference evaluation device 60 is identified as a device implemented by loading a program for implementing functional units described below into the main memory 42 (see FIG. 2) from, for example, the magnetic disk device 43 (see FIG. 2) and executing the program by the CPU 41 in the offline teaching system 40 (see FIG. 2).

As illustrated in FIG. 4, the interference evaluation device 60 includes an axis value obtaining unit 61, a reference point calculation unit 62, an extension direction calculation unit 63, an interference determination unit 64, an evaluation value setting unit 65, and an evaluation value output unit 66.

The axis value obtaining unit 61 obtains axis values determined in accordance with the teaching program. In this embodiment, axis values are used as an example of posture information indicating a posture to be taken by a welding robot, and the axis value obtaining unit 61 is provided as an example of obtaining means for obtaining posture information.

The reference point calculation unit 62 calculates the coordinates of the reference point P by using the coordinates of the reference point obtained when the axis values are 0 and the axis values obtained by the axis value obtaining unit 61. The details of a method for calculating the coordinates of the reference point P will be described below. In this embodiment, the coordinates of the reference point obtained when the axis values are 0 are used as an example of information (part of reference information) indicating the position of the torch cable when the welding robot takes a reference posture. Further, the coordinates of the reference point P are used as an example of information (part of change information) indicating the position of the torch cable when the welding robot changes its posture. Further, the reference point calculation unit 62 is provided as an example of first calculation means for calculating part of change information. Further, the reference point calculation unit 62 is provided as an example of a function of calculating part of change information by generation means for generating evaluation information.

The extension direction calculation unit 63 calculates vector components in the cable extension direction V by using vector components in the cable extension direction obtained when the axis values are 0 and the axis values obtained by the axis value obtaining unit 61. The details of a method for calculating the vector components in the cable extension direction V will be described below. In this embodiment, the vector components in the cable extension direction obtained when the axis values are 0 are used as an example of information (part of reference information) indicating the direction in which the torch cable extends when the welding robot takes a reference posture. Further, the vector components in the cable extension direction V are used as an example of information (part of change information) indicating the direction in which the torch cable extends when the welding robot changes its posture. Further, the extension direction calculation unit 63 is provided as an example of first calculation means for calculating part of change information. Further, the extension direction calculation unit 63 is provided as an example of a function of calculating part of change information by generation means for generating evaluation information.

The interference determination unit 64 determines whether the reference point P is included in the arm 11 by using the coordinates of the reference point P and the width and height of the arm 11. If the reference point P is not included in the arm 11, the interference determination unit 64 determines whether a point Q of intersection with the arm 11 is present in the cable extension direction. V as viewed from the reference point P. The details of these determination methods will be described below. Then, the interference determination unit 64 transmits obtained determination results to the evaluation value setting unit 65. In this embodiment, the width and height of the arm 11 are used as an example of area information indicating an area occupied by the arm.

When a determination result indicating that the reference point P is included in the arm 11 is transmitted from the interference determination unit 64, the evaluation value setting unit 65 sets value 0, which represents an evaluation value with interference, as an index r. When a determination result indicating that the reference point P is not included in the arm 11 is transmitted from the interference determination unit 64, the evaluation value setting unit 65 sets a maximum value that can be set as a radius of curvature, which represents an evaluation value without interference, as the index r if a determination result indicating the point Q of intersection with the arm 11 is not present in the cable extension direction V as viewed from the reference point P is transmitted from the interference determination unit 64. In this case, if a determination result indicating the point Q of intersection with the arm 11 is present in the cable extension direction V as viewed from the reference point P is transmitted from the interference determination unit 64, the evaluation value setting unit 65 sets a virtual radius of curvature of the torch cable 15 as the index r. The details of a method for calculating the virtual radius of curvature of the torch cable 15 will be described below. In this embodiment, an index r obtained when a determination result indicating the presence of the point Q of intersection is transmitted is used as an example of evaluation information indicating the degree of bend of the torch cable. Further, the function of the evaluation value setting unit 65, which is implemented when a determination result indicating the presence of the point Q of intersection is transmitted, is provided as an example of second calculation means for calculating evaluation information. Further, the function of the evaluation value setting unit 65, which is implemented when a determination result indicating the presence of the point Q of intersection is transmitted, is provided as an example of a function of calculating evaluation information by using a generation means for generating evaluation information.

The evaluation value output unit 66 outputs the index r for which an evaluation value is set by the evaluation value setting unit 65. In this embodiment, the evaluation value output unit 66 is provided as an example of output means for outputting evaluation information.

Operation of Interference Evaluation Device

Figure 5:
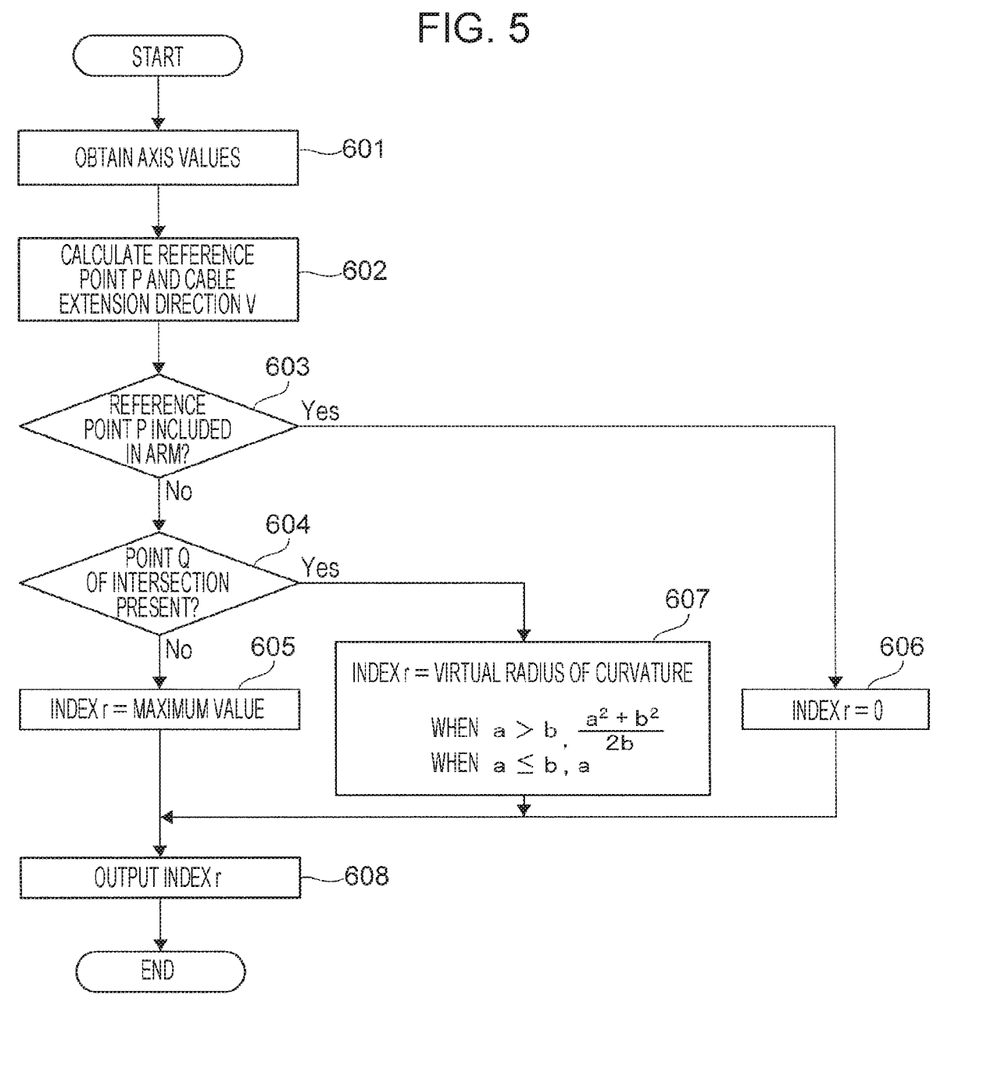
FIG. 5 is a flowchart illustrating an example operation of the interference evaluation device according to the embodiment of the present invention.

FIG. 5 is a flowchart illustrating an example operation of the interference evaluation device 60 according to this embodiment.

When the operation of the interference evaluation device 60 is started, first, the axis value obtaining unit 61 obtains axis values ($\theta 5$ and $\theta 6$) determined in accordance with the teaching program (step 601).

Then, the reference point calculation unit 62 calculates the coordinates (px, py, pz) of the reference point P, and the extension direction calculation unit 63 calculates the vector components (vx, vy, vz) in the cable extension direction V (step 602). In this case, the following formulas are used.

$$P = \begin{pmatrix} px \\ py \\ pz \end{pmatrix} = \begin{pmatrix} \cos\theta 5 & 0 & \sin\theta 5 \\ 0 & 1 & 0 \\ -\sin\theta 5 & 0 & \cos\theta 5 \end{pmatrix} \begin{pmatrix} 1 & 0 & 0 \\ 0 & \cos\theta 6 & -\sin\theta 6 \\ 0 & \sin\theta 6 & \cos\theta 6 \end{pmatrix} \begin{pmatrix} x_{ref} \\ y_{ref} \\ z_{ref} \end{pmatrix} =$$

$$\begin{pmatrix} x_{ref}\cos\theta 5 + y_{ref}\sin\theta 5\sin\theta 6 + z_{ref}\sin\theta 5\cos\theta 6 \\ y_{ref}\cos\theta 6 - z_{ref}\sin\theta 6 \\ -x_{ref}\sin\theta 5 + y_{ref}\cos\theta 5\sin\theta 6 + z_{ref}\cos\theta 5\cos\theta 6 \end{pmatrix}$$

$$V = \begin{pmatrix} vx \\ vy \\ vz \end{pmatrix} = \begin{pmatrix} \cos\theta 5 & 0 & \sin\theta 5 \\ 0 & 1 & 0 \\ -\sin\theta 5 & 0 & \cos\theta 5 \end{pmatrix} \begin{pmatrix} 1 & 0 & 0 \\ 0 & \cos\theta 6 & -\sin\theta 6 \\ 0 & \sin\theta 6 & \cos\theta 6 \end{pmatrix} \begin{pmatrix} u_{ref} \\ v_{ref} \\ w_{ref} \end{pmatrix} =$$

$$\begin{pmatrix} u_{ref}\cos\theta 5 + v_{ref}\sin\theta 5\sin\theta 6 + w_{ref}\sin\theta 5\cos\theta 6 \\ v_{ref}\cos\theta 6 - w_{ref}\sin\theta 6 \\ -u_{ref}\sin\theta 5 + v_{ref}\cos\theta 5\sin\theta 6 + w_{ref}\cos\theta 5\cos\theta 6 \end{pmatrix}$$

Accordingly, the interference determination unit 64 determines whether the reference point P is included in the arm 11 (step 603). In this embodiment, since the center of rotation of the wrist portion 12 is positioned at the center of the arm 11, this determination is easily performed by examining whether the coordinates (px, py, pz) of the reference point P satisfy conditions "px<0, |py|0.5W, and |pz|≤0.5H".

Note that the first condition for determining whether the reference point P is included in the arm 11 is not exactly "px<0". However, here, when the Y coordinate py and the Z coordinate pz of the reference point P are respectively within the width W and height H of the arm 11 (when the second and third conditions are satisfied), it is additionally determined whether the reference point P is positioned in front of or behind the arm 11, thereby facilitating the determination of whether the reference point P is included in the arm 11.

If the interference determination unit 64 determines that the reference point P is included in the arm 11, the process proceeds to step 606; if the interference determination unit 64 determines that the reference point P is not included in the arm 11, the process proceeds to step 604.

In the latter case, the interference determination unit 64 determines whether the point Q of intersection with the arm 11 is present in the cable extension direction V as viewed from the reference point P (step 604). The point Q of intersection is a point at which a ray starting at the reference point P in the cable extension direction V intersects an upper surface or lower surface of the arm 11.

Thus, when the Z coordinate pz of the reference point P is positive, it is examined that a satisfying the following equation is present as a positive value and that the conditions "x<0 and |y|≤0.5W" are satisfied, thereby easily determining that the point Q of intersection is on the arm 11.

$$Q = P + \alpha V = \begin{pmatrix} x \\ y \\ 0.5H \end{pmatrix}$$

When the Z coordinate pz of the reference point P is negative, on the other hand, it is examined that a satisfying the following equation is present as a positive value and that the conditions "x<0 and |y|≤0.5W" are satisfied, thereby easily determining that the point Q of intersection is on the arm 11.

$$Q = P + \alpha V = \begin{pmatrix} x \\ y \\ -0.5H \end{pmatrix}$$

If the interference determination unit 64 determines that the point Q of intersection with the arm 11 is present, the process proceeds to step 607; if the interference determination unit 64 determines that the point Q of intersection with the arm 11 is not present, the process proceeds to step 605.

In the latter case, no interference occurs between the torch cable 15 and the arm 11. Thus, the evaluation value setting unit 65 sets a maximum value that can be set as a radius of curvature, which represents an evaluation value without interference, as the index r (step 605).

If the interference determination unit 64 determines in step 603 that the reference point P is included in the arm 11, interference occurs between the reference point P and the arm 11. Thus, the evaluation value setting unit 65 sets value 0, which represents an evaluation value with interference, as the index r (step 606).

Further, if the interference determination unit 64 determine in step 604 that the point Q of intersection with the arm 11 is present, the evaluation value setting unit 65 calculates a virtual radius of curvature of the torch cable 15 from the relationship among the arm 11, the reference point P, the cable extension direction V, and the point Q of intersection and sets the virtual radius of curvature as the index r (step 607). The virtual radius of curvature is used to indicate that the torch cable 15 does not actually have a curved profile with this radius of curvature but indicate that calculation is performed assuming theoretically that the torch cable 15 has a curved profile with this radius of curvature.

Figures 6A, 6B:
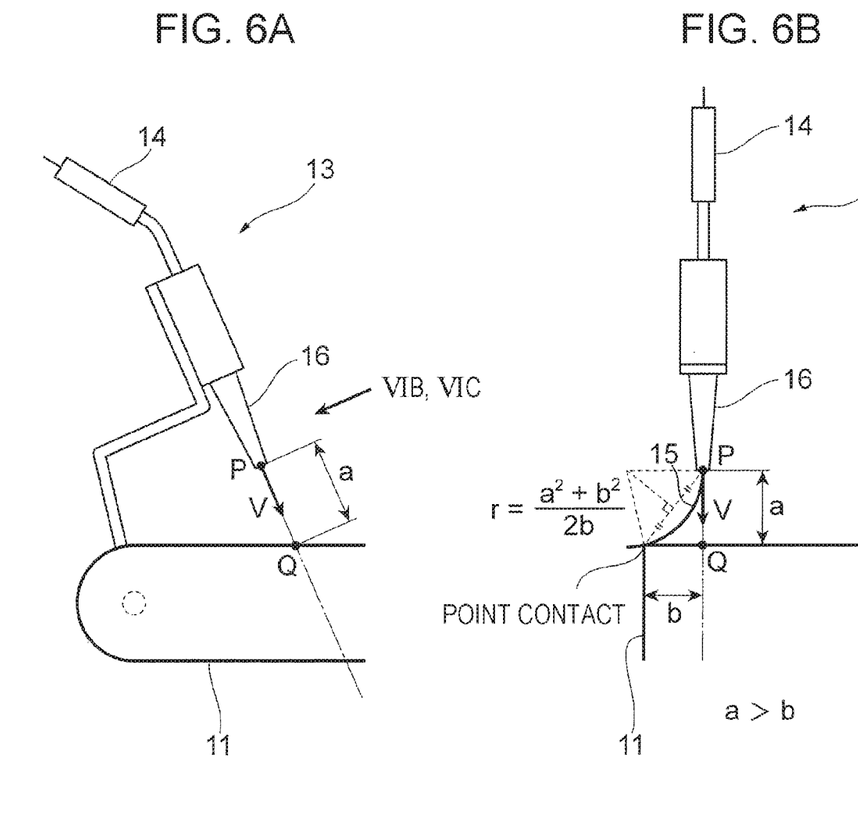
FIGS. 6A to 6C are diagrams illustrating a method for calculating a virtual radius of curvature.
Figure 6C:
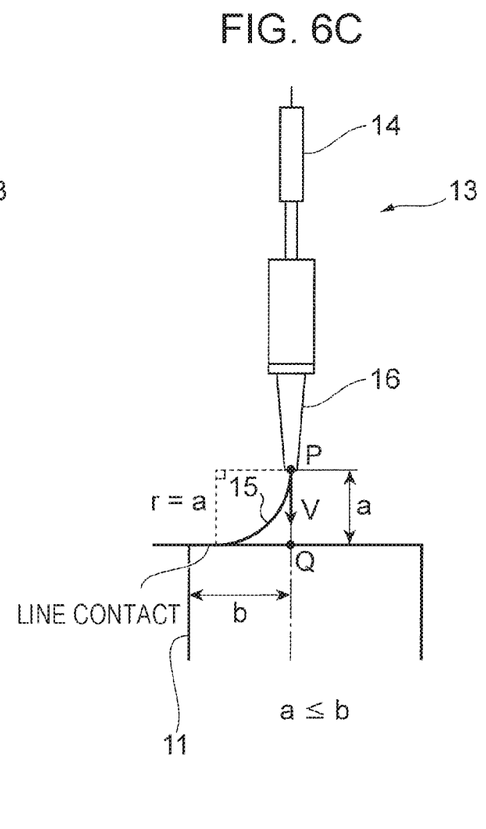

A method for calculating the virtual radius of curvature will now be described. FIGS. 6A to 6C are diagrams illustrating a method for calculating a virtual radius of curvature. FIG. 6A is a diagram illustrating a positional relationship between the arm 11 and the welding tool 13 on the XZ plane illustrated in FIG. 3. FIGS. 6B and 6C are sectional views taken along arrows VIB and VIC in FIG. 6A.

In this embodiment, as illustrated in FIGS. 6B and 6C, the distance between the reference point P and the point Q of intersection is represented by a, and the distance between the point Q of intersection and the closest corner of the arm 11 is represented by b. Further, the torch cable 15 is assumed to draw an arc having a constant curvature from a boundary portion with the torch cable holder 16 (in this embodiment, this boundary portion coincides with the reference point P) to a contact portion with the arm 11, and the direction of the tangent of the arc in the boundary portion with the torch cable holder 16 is represented as the cable extension direction V.

When a>b, as illustrated in FIG. 6B, it can be assumed that only the position of the torch cable 15 is constrained in the contact portion with the arm 11 but the direction of the torch cable 15 is not constrained. Accordingly, a virtual radius of curvature determined by using a simple calculation below is set as the index r.

$$r = \frac{a^2 + b^2}{2b}$$

When a≤b, in contrast, as illustrated in FIG. 6C, the position of the torch cable 15 is constrained in the contact portion with the arm 11, and the direction of the torch cable 15 is constrained to a surface direction of the arm 11. In addition, the virtual radius of curvature of the arc drawn by the torch cable 15 is constant. Accordingly, the distance a is set as the index r.

If the obtained calculation result exceeds the virtual radius of curvature that represents an evaluation value without interference, a maximum value that can be set may be set as the index r.

Thereafter, the evaluation value output unit 66 outputs the index r for which the evaluation value is set by the evaluation value setting unit 65 (step 608). At this time, if the index r is within an allowable range, the evaluation value output unit 66 may output information indicating that the index r is within the allowable range (information indicating that no problem exists).

The foregoing describes a calculation method including determining a simple radius of curvature (virtual radius of curvature) of the torch cable 15 and setting the radius of curvature as an index of the degree of interference of the torch cable 15.

While this embodiment describes an example in which the interference evaluation device 60 is implemented by the offline teaching system 40, the interference evaluation device 60 may be implemented by the teaching pendant 30, a simulator (not illustrated), or the like.

While not described in this embodiment, the interference evaluation device 60 may be activated when a teaching program is created or when a teaching program created or modified in advance is examined.

In this embodiment, furthermore, as a non-limiting example, the axis values are obtained from the teaching program. For example, also when the teaching pendant 30 is used to teach an operation to the welding robot 10, in some cases, the amount of deviation of a workpiece may be numerically corrected or a repetitive operation with a shift such as a translation shift may be duplicated to create or edit teaching data. In such cases, the axis values may be obtained from the teaching data instead of the teaching program.

The teaching program and the teaching data are examples of teaching information for teaching an operation to a welding robot.

Advantages of Embodiment

As described above, this embodiment enables the evaluation of the degree of interference between the torch cable 15 and the arm 11 merely by defining a reference point and extension direction vector in accordance with the welding tool 13 and the torch cable 15 without performing simulation using a three-dimensional model or the like.

More specifically, an index of the degree of interference between the torch cable 15 and the arm 11 can be determined through a simple calculation, and an operator or a system can be informed of the appropriateness of the teaching program or the like in advance by using the index. Thus, when an actual device is activated, the device is operated carefully at a point at which the index is not cleared but it is not clearly indicated that interference occurs and whose value is close to an allowed value, to determine whether operation is possible. In addition, when an automatic programming or the like is used to search for a redundant axis to calculate a plurality of candidate teaching programs (trajectories), candidates for which the index of the degree of interference is cleared are selected. This enables safe operation of an automatically created teaching program.

What is claimed is:

1. An evaluation information output device comprising a processor and a memory, the processor configured to:

obtain posture information indicating a posture to be taken by a welding robot, on the basis of teaching information for teaching an operation to the welding robot;

generate evaluation information indicating a degree of bend of a torch cable, which is caused by the torch cable contacting an arm of the welding robot, by using the posture information, the torch cable being included in a welding tool attached to an end of the arm and extending in a direction away from a welding torch of the welding tool, the generating evaluation information including calculating change information indicating a position of the torch cable and an extension direction of the torch cable when the welding robot changes the posture, by using reference information indicating a position of the torch cable and an extension direction of the torch cable when the welding robot takes a reference posture and by using the obtained posture information, and calculating the evaluation information by using the calculated change information and area information indicating an area occupied by the arm; and output the evaluation information.

2. The evaluation information output device according to claim 1, wherein the processor generates, as the evaluation information, a radius of an arc that approximates the degree of bend of the torch cable.

3. The evaluation information output device according to claim 2, wherein the arc is an arc passing through a boundary point between a torch cable holder of the welding tool and the torch cable and passing through a contact point between the torch cable and the arm when the contact between the torch cable and the arm is a point contact.

4. The evaluation information output device according to claim 2, wherein the arc is an arc passing through a boundary point between a torch cable holder of the welding tool and the torch cable and passing through a contact point that is closest to the boundary point among contact points between the torch cable and the arm when the contact between the torch cable and the arm is a line contact.

5. The evaluation information output device according to claim 1, wherein the processor generates the evaluation information by using different methods when the contact between the torch cable and the arm is a point contact and when the contact between the torch cable and the arm is a line contact.

6. The evaluation information output device according to claim 1, wherein when the evaluation information is within an allowable range, the processor further outputs information indicating that the evaluation information is within the allowable range.

7. An evaluation information output method comprising:

obtaining posture information indicating a posture to be taken by a welding robot, on the basis of teaching information for teaching an operation to the welding robot;

generating evaluation information indicating a degree of bend of a torch cable, which is caused by the torch cable contacting an arm of the welding robot, by using the obtained posture information, the torch cable being included in a welding tool attached to an end of the arm and extending in a direction away from a welding torch of the welding tool, the generating evaluation information including calculating change information indicating a position of the torch cable and an extension direction of the torch cable when the welding robot changes the posture, by using reference information indicating a position of the torch cable and an extension direction of the torch cable when the welding robot takes a reference posture and by using the obtained posture information, and calculating the evaluation information by using the calculated change information and area information indicating an area occupied by the arm; and outputting the generated evaluation information.

8. A program for causing a computer to implement:

a function of obtaining posture information indicating a posture to be taken by a welding robot, on the basis of teaching information for teaching an operation to the welding robot;

a function of generating evaluation information indicating a degree of bend of a torch cable, which is caused by the torch cable contacting an arm of the welding robot, by using the obtained posture information, the torch cable being included in a welding tool attached to an end of the arm and extending in a direction away from a welding torch of the welding tool, the generating evaluation information including calculating change information indicating a position of the torch cable and an extension direction of the torch cable when the welding robot changes the posture, by using reference information indicating a position of the torch cable and an extension direction of the torch cable when the welding robot takes a reference posture and by using the obtained posture information, and calculating the evaluation information by using the calculated change information and area information indicating an area occupied by the arm; and a function of outputting the generated evaluation information.

* * * * *